US006876465B1

United States Patent
Morikawa et al.

(10) Patent No.: US 6,876,465 B1
(45) Date of Patent: Apr. 5, 2005

(54) IMAGE PROCESSING SYSTEM AND IMAGE PROCESSING METHOD

(75) Inventors: Takeshi Morikawa, Okazaki (JP); Yoshikazu Ikenoue, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 933 days.

(21) Appl. No.: 09/675,026

(22) Filed: Sep. 28, 2000

(30) Foreign Application Priority Data

Sep. 30, 1999 (JP) .......................................... 11-280258

(51) Int. Cl.⁷ .............................................. G06F 15/00
(52) U.S. Cl. ..................... 358/1.16; 358/1.17; 358/296; 358/444
(58) Field of Search .............................. 358/1.17, 1.16, 358/296, 400, 444, 468, 1.15, 534; 347/247, 237

(56) References Cited

U.S. PATENT DOCUMENTS

| 5,724,154 A | * | 3/1998 | Ito et al. ..................... 358/400 |
| 6,023,560 A | | 2/2000 | Yoshida et al. ............. 395/115 |

FOREIGN PATENT DOCUMENTS

| JP | 07-221945 A | 8/1995 |
| JP | 07-221948 A | 8/1995 |
| JP | 07-288638 A | 10/1995 |
| JP | 09-149165 A | 6/1997 |
| JP | 09-274605 A | 10/1997 |
| JP | 10-304111 A | 11/1998 |

* cited by examiner

*Primary Examiner*—Twyler Lamb
(74) *Attorney, Agent, or Firm*—Sidley Austin Brown & Wood LLP

(57) ABSTRACT

An image processing system and method wherein image data is compressed and written to memory. The system includes a first controller, a second controller, a first detector, a third controller and a second detector. The first controller sequentially executes a reading and an image processing of image data from memory. The second controller sequentially executes a re-reading and an image processing of the image data from memory. The first detector detects insufficiency of empty capacity of the memory based on a size of image data of one page compressed at a predetermined compression rate. If insufficient memory for new image data is detected, the third controller writes new image data after a termination of the image processing of the image data of at least one page previously stored. The second detector detects overwriting by the third controller of the new image data on the stored image data.

13 Claims, 11 Drawing Sheets

(A) | * TOTAL MEMORY AREA FOR ONE JOB * |
| R1 |

(B) | * TOTAL MEMORY AREA FOR ONE JOB * |
| P1 | R2 |

(C) | * TOTAL MEMORY AREA FOR ONE JOB * |
| P1 | P2 | R3 |

(D) | * TOTAL MEMORY AREA FOR ONE JOB * |
| P1 | P2 | P3 ¥→
→¥ |

(E) | * TOTAL MEMORY AREA FOR ONE JOB * |
| P1 | P2 | P3 | R¥→
→¥4 |

(F) | * TOTAL MEMORY AREA FOR ONE JOB * |
| P1 | P2 | P3→→→→→¥→
→¥→ |

FIG. 9

(A)   | * TOTAL MEMORY AREA FOR ONE JOB * |
      | * RESERVATION POSSIBLE AREA * | * EMPTY AREA * |
      |       R1        |

(B)   | * TOTAL MEMORY AREA FOR ONE JOB * |
      | * RESERVATION POSSIBLE AREA * | * EMPTY AREA * |
      | P1 |    R2    |

(C)   | * TOTAL MEMORY AREA FOR ONE JOB * |
      | * RESERVATION POSSIBLE AREA * | * EMPTY AREA * |
      | P1 | P2 |   R3   |

(D)   | * TOTAL MEMORY AREA FOR ONE JOB * |
      | * RESERVATION POSSIBLE AREA * | * EMPTY AREA * |
      | P1 | P2 |   P3   ¥→
      →¥    |

(E)   | * TOTAL MEMORY AREA FOR ONE JOB * |
      | * RESERVATION POSSIBLE AREA * | * EMPTY AREA * |
      | P1 | P2 | P3 |  R¥→
      →¥4      |

(F)   | * TOTAL MEMORY AREA FOR ONE JOB * |
      | * RESERVATION POSSIBLE AREA * | * EMPTY AREA * |
      | P1 | P2 | P3→→→¥→
      →¥→    |

FIG.11

IMAGE PROCESSING SYSTEM AND IMAGE PROCESSING METHOD

This application claims priority to Japanese Patent Application No. H11(1999)-280258 filed on Sep. 30, 1999, the disclosure of which is incorporated by reference in its entirety.

BACKGROUND OF THE INVENTION

1. Field of the Invention

The present invention relates to an image processing system such as a print system for use in a copying machine, a printer and the like, and also relates to an image processing method.

2. Description of Related Art

In a print system as one of image processing systems, image data sent from an image scanner, a personal computer and other equipments is written into a memory such as a DRAM (Dynamic Random Access Memory) after being stored in a hard disk or without being stored in a hard disk. The written image data is read out from the memory, and then is subjected to an image processing to be printed.

Generally, image data of a plurality of pages is written into a DRAM in a compressed state at a compression rate of from 100% to 5% depending on the original attributes. For example, the compression rate of image data of a page including many characters, is excellent. On the other hand, the compression rate of image data of a page including a large amount of half tones such as a picture, is poor.

Furthermore, as an image processing mode, an electronic sort mode and a memory recall mode are known. In the electronic sort mode, a processing of reading out image data from a DRAM in a predetermined page order, for example, page 1 to page N→page 1 to page N→ . . . , and printing the image, is repeated a plurality of times. In the memory recall mode, image data of an image once printed is held in a memory such as a DRAM or a hard disk. Thereafter, the image data is read out from the memory again based on, for example, a re-print request of a user, and printed.

As one example of a prior art of an image processing system disclosing a part of the aforementioned structure, Japanese Unexamined Laid-open Patent Publication No. H10-304111 is known. According to this prior art, in writing image data into a DRAM, in cases where empty capacity of a DRAM becomes smaller than an average capacity of image data of one page during a storing of image data of page n+1 into the DRAM after the completion of storing image data of page 1 to page n, the image data of page n+1 is stored, and then the subsequent processing is executed. In other words, from the earlier page, i.e., from page 1, among pages from page 1 to page n+1 in which image data is stored, the image data is discarded from the DRAM to secure empty capacity of the DRAM in turn. Then, the image data of page n+2 and the subsequent pages are stored in the empty area of the DRAM to continue printing operations.

However, in the aforementioned conventional image processing system, when it becomes impossible to secure a predetermined empty capacity of the DRAM, or it becomes insufficient to secure the empty capacity thereof, during the storing of the image data of page n+1 into the DRAM, even if it is possible to store the image data of page n+2 into the DRAM because the image size is actually smaller than the expected size, it requires to discard the image data of from page 1 from the DRAM in turn to secure an empty capacity of the DRAM. Therefore, it is necessary to hold an transmission of the image data from an image scanner or a personal computer, or to suspend the processing of the image data.

Such drawbacks do not always occur only in a print system but may occur in other image processing systems.

SUMMARY OF THE INVENTION

It is an object of the present invention to provide an image processing system which can execute a writing of image data as large amount as possible even if empty capacity of a memory becomes insufficient during the writing of the image data into a memory when a writing of a set of image data of a plurality of pages into the memory, a reading out of the image data from the memory and an image processing thereof are repeatedly performed in a predetermined page order.

It is another object of the present invention to provide an image processing method which can execute a writing of image data as large amount as possible even if empty capacity of a memory becomes insufficient during the writing of the image data into a memory.

According to a first aspect of the present invention, an image processing system includes:

a memory for storing image data of a plurality of pages;

a compressor for compressing input image data;

writing means for writing a set of image data of a plurality of pages compressed by the compressor into the memory in sequence;

a first controller which executes a reading of the set of stored image data from the memory and an image processing thereof in sequence;

a second controller which executes a re-reading of the set of stored image data from the memory and an image processing thereof in sequence;

a first detector for detecting insufficiency of empty capacity of the memory based on a capacity of image data of one page compressed at a predetermined compression rate; and a third controller which, in the event that insufficiency of empty capacity of the memory is detected by the first detector during the writing of image data into the memory by the writing means, continues the image processing by the first controller by writing new image data by the writing means after a termination of the image processing of the image data of at least one page stored previously by the first controller; and a second detector which detects an occurrence of an overwriting of the new image data on the stored image data at the time of writing the new image data by the third controller.

With this image processing system, even if insufficiency of empty capacity of the memory is detected during the writing of the image data into the memory in repeatedly executing a writing of the set of image data of a plurality of pages into the memory, a reading out of the image data from the memory and an image processing thereof in a predetermined page order in such a mode as an electronic sort mode or a memory recall mode, a writing of new image data into the memory and a storing of the image data written in the memory are continued until an overwriting of newly written image data on the already written image data of the predetermined page is detected. Accordingly, it is possible to store image data as large amount as possible and execute the image processing thereof.

Furthermore, since the new image data is written in the memory after the completion of image processing of the already written image data of a prescribed page, an overwriting on the image data whose image processing has not been executed will not occur.

According to the second aspect of the present invention, an image processing method which compresses a set of input image data of a plurality of pages in sequence, writes the compressed image data into a memory in sequence and reads out the stored set of image data from the memory in sequence and executes an image processing thereof, the method includes the steps of:

detecting insufficiency of empty capacity of the memory based on a capacity of compressed image data of one page at a prescribed compression rate during the writing of the image data into the memory;

continuing the image processing by writing new image data after a termination of the image processing of the image data of at least one page previously stored when insufficiency of empty capacity of the memory is detected;

detecting an overwriting of the new image data on the image data already stored at the time of writing of the new image data; and executing the image processing by reading out the set of stored image data again from the memory in sequence when no overwriting is detected, and prohibiting an execution of the image processing by reading the image data again when the overwriting is detected.

With the aforementioned image processing method too, in cases where empty capacity of the memory is detected during the writing of the image data into the memory in a processing mode such as an electronic sort mode or a memory recall mode, a writing of new image data into the memory and a storing and holding of the image data written in the memory are continued until an overwriting of the newly written image data on the already written image data of a certain page is detected. Accordingly, it is possible to store image data as large amount as possible and execute the image processing thereof.

According to the third aspect of the present invention, an image processing system, includes:

a memory for storing image data of a plurality of pages;

a compressor for compressing input image data;

writing means for writing a set of image data of a plurality of pages compressed by the compressor into the memory in sequence;

a first controller which executes a reading of the set of stored image data from the memory and an image processing thereof in sequence;

a second controller which executes a re-reading of the set of stored image data from the memory and an image processing thereof in sequence;

a second detector which detects an occurrence of an overwriting of image data on the stored image data at the time of writing the image data into the memory by the writing means; and canceling means for canceling the image processing by the second controller when the overwriting is detected by the second detector.

In the aforementioned image processing method, in the event that an overwriting of the image data on the already stored image data is detected during the writing of the set of image data of a plurality of image data into the memory in turn, the image processing operation for repeatedly reading out the stored set of image data from the memory in turn, i.e., the operation in a memory recall mode or an electronic sort mode, will be canceled.

Other objects and the features will be apparent from the following detailed description of the invention with reference to the attached drawings.

BRIEF DESCRIPTION OF DRAWINGS

The present invention will be more fully described and better understood from the following description, taken with the appended drawings, in which:

FIG. 9 is an explanatory view for explaining the operation together with the contents of the memory when the memory becomes full;

FIG. 11 is a flowchart showing another subroutine of the reading processing in the flowchart shown in FIG. 8.

DETAILED DESCRIPTION OF THE PREFERRED EMBODIMENTS

Figure 1:
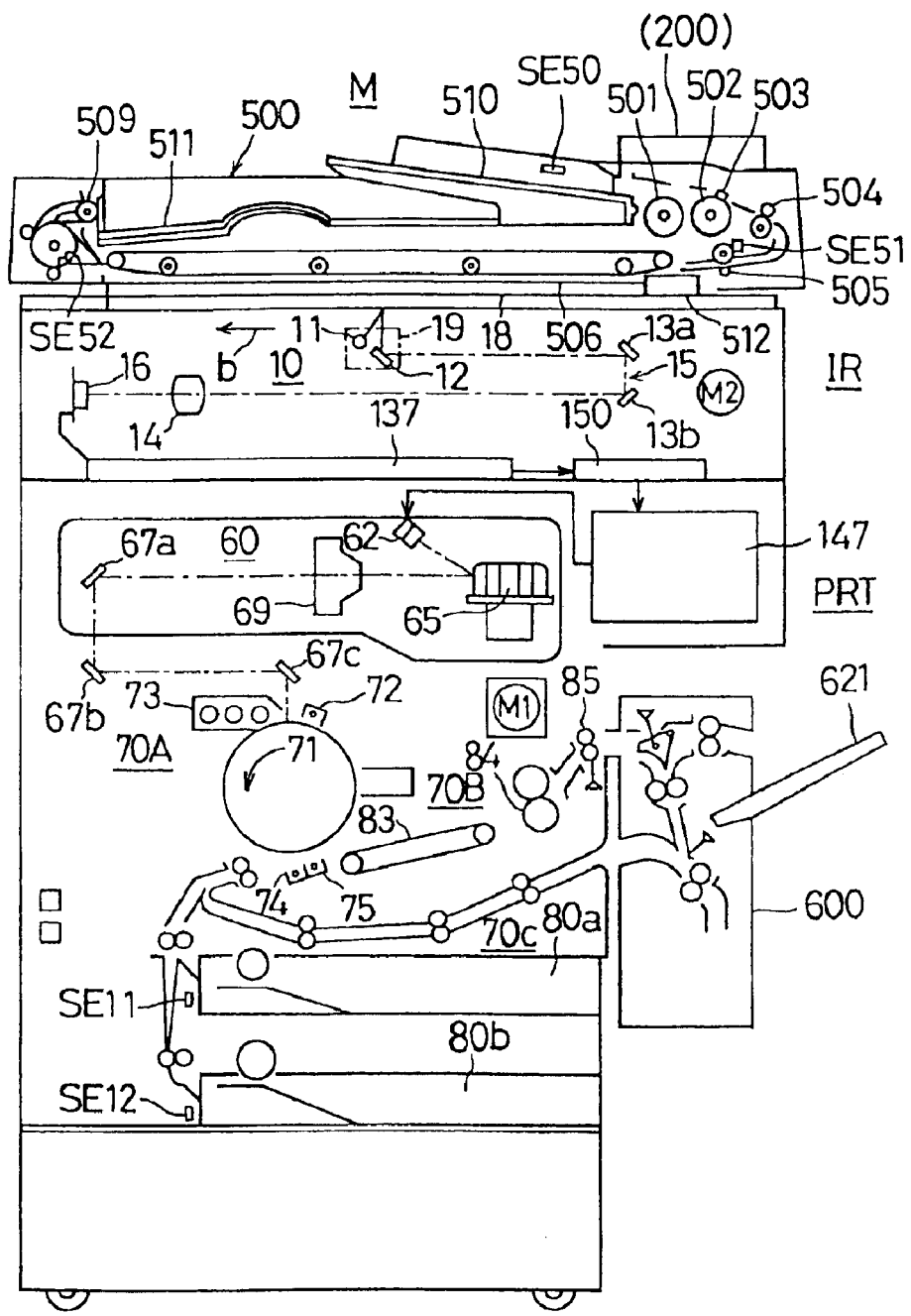
FIG. 1 is a schematic structural view of a copying machine to which an image processing system according to an embodiment of the present invention is applied.

FIG. 1 is a front vertical cross-sectional view showing a schematic structure of a copying machine M equipped with a print system which is an image processing system according to one embodiment of the presents invention. As shown in FIG. 1, the copying machine M is a digital copying machine equipped with an image reader IR and a page printer PRT.

In the following explanations, "memory full" means the state where it becomes impossible to store image data in a memory due to insufficient memory capacity, and "memory near full" means the state where it becomes impossible to store image data in a memory under the condition that a predetermined empty capacity remains in the memory.

The image reader IR includes a scanner 10, an input signal processor 137 and an image memory 150, and reads an original document placed on an original document placing glass plate 18 to generate image data corresponding to each pixel of the original image. A first scanner 19 equipped with an exposure lamp 11 and a first mirror 12 and a second scanner 15 equipped 1 with a second mirror 13a and a third mirror 13b are driven by a scan motor M2 in the direction of an arrow b (the sub-scanning direction). The light of the exposure lamp 11 is reflected by the original document placed on the original document placing glass plate 18 to be irradiated into a line sensor 16 via the mirrors 12, 13a and 13b and a lens 14. The line sensor 16 is comprised of a number of photoelectric converting elements (CCD) arranged in the direction perpendicular to the paper of FIG. 1 (in the main scanning direction) to output image data corresponding to each pixel. Since the first scanner 19 and the second scanner 15 moves in the direction b as mentioned, the line sensor 16 can sub-scan the original image. In the meantime, it is detected by a sensor (not shown) whether or not the first scanner 19 is positioned at its home position.

On the body of the image reader IR, an automatic both-sided document feeder (ADFR) 500, which also functions as an original document cover, is connected such that it can open and close about the rear end as a fulcrum. The ADFR 500 transfers the original documents set on an original document stacker 510 onto the original document placing glass plate 18 by paper-feeding rollers 501, guide rollers 502, guide pads 503, intermediate rollers 504, resist rollers 505 and a transferring belt 506, and discharges the scanned original document onto the original document discharge tray 511 by paper-discharging rollers 509. Furthermore, provided to the ADFR 500 are an original document scale 512, an original document sensor SE50 which detects whether there is an original document, an original document size sensor SE51 and a discharge sensor SE52. The reference numeral 200 in FIG. 1 denotes an operation panel.

The page printer PRT includes a printing processor 147 which outputs an exposure control signal, a print head 60 with a semiconductor laser 62 as a light source, a development/transfer system 70A including a photosensitive drum 71 and its peripherals, a fixing/discharging system 70B including a fixing roller 84 and a discharging roller 85 and a circulation type paper discharge system 70C including a paper re-supplying unit 600. The page printer PRT prints a reproduced image through an electrophotography process based on the image data transferred from the image reader IR. Provided at the lower portion of the page printer PTR are two paper cassettes 80a and 80b in which several hundreds of papers can be stored and two paper size sensors SE11 and SE12 and paper feeding rollers.

The laser beam output from the semiconductor laser 62 is changed its traveling direction toward the main scanning direction by a polygon mirror 65. Thereafter, the laser bean is led to an exposure position on a photosensitive drum 71 via a main lense 69 and various mirrors 67a, 67b and 67c. The surface of the photosensitive drum 71 is uniformly charged with electricity by an electrification charger 72. The latent image formed by an exposure changes into a toner image by a developer 73, and is transcribed onto a paper at a transcribing position by a transcribing charger 74. Then, the paper is detached from the photosensitive drum 71 by a detaching charger 75, and then is discharged to a discharging tray 621 with its face up via a transferring belt 83, the fixing rollers 84 and the discharging rollers 85.

Figure 2:
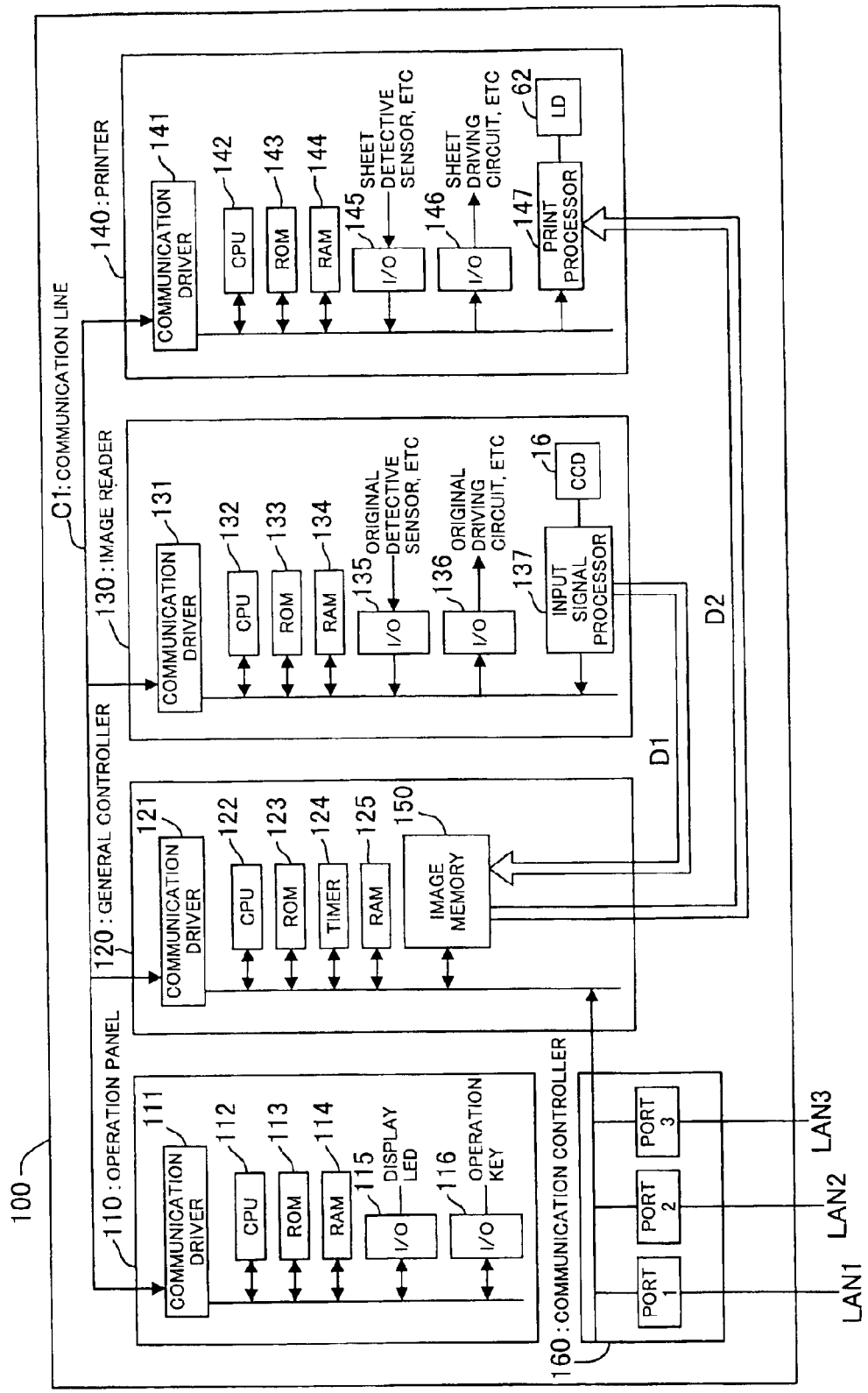
FIG. 2 is a block diagram of the control unit of the copying machine shown in FIG. 1.

FIG. 2 is a block diagram showing a structure of a control unit for controlling the copying machine M. As shown in FIG. 2, the control unit 100 includes an operation panel controller 110, a general controller 120, an image reader controller 130 (image reader IR) and a printer controller 140. The operation panel controller 110 includes a communication driver 111, a CPU 112, a ROM 113, a RAM 114, two I/O (input/output portions) 115 and 116. The general controller 120 includes a communication driver 121, a CPU 122, a ROM 123, a timer 124, a RAM 125 and an image memory 150. The image reader controller 130 includes a communication driver 131, a CPU 132, a ROM 133, a RAM 134, two I/O 135 and 136, an input signal processor 137 and a CCD 16. The print controller 140 includes a communication driver 141, a CPU 142, a ROM 143, a RAM 144, two I/O 145 and 146, a print processor 147 and a semiconductor laser (LD) 62. These blocks 110, 120, 130 and 140 are connected with each other via the communication drivers 111, 121, 131 and 141 and a communication cable C1 (communication line) to exchange commands and/or status by serial communications.

The copying machine M is connected to three LANs (LAN 1 to LAN 3) via a communication controller 160 so as to form (i.e., print) an image in accordance with the image data transmitted from each personal computer on the LANs 1 to 3.

The operation panel controller 110 is a block for controlling the operation panel. The controller reads the information input through various operation keys or a touch panel, and displays the set information and/or the operation status of the copying machine on the light-emitting diode (LED) or the liquid crystal display (LCD) 206 shown in FIG. 4. The information input by a user through key operations or touch panel operations is transmitted as a copy mode to the general controller 120 via the communication cable C1.

The image reader controller 130 controls the scanner 10 and the ADFR 500. The controller detects whether there is an original document on the ADFR 500 and/or the transferring status of the original document via the I/O 135, and controls an original document driving circuit and a mirror driving circuit for scanning an original document via the I/O 136. Furthermore, after the image data of the original document read by the CCD 16 is processed at the input signal processor 137, the processed image data is transmitted to the general controller 120 and stored in the image memory 150.

The printer controller 140 controls the aforementioned page printer PRT and the discharging system option. The controller executes various processing including a paper feeding, a developing, a transferring and a fixing to form an image on a predetermined paper.

The general controller 120 controls the whole apparatus, and also manages the image data written by the image reader IR. In the aforementioned image memory 150 of the general controller 120, image data of a number of pages written by the image reader IR can be stored. The image data transmitted from the image reader IR is stored in the image memory 150 via the image bus D1. At the time of printing, the image data is transmitted to the printer controller 140 via the image bus D2. Then, an image print is formed. The image memory 150 will be detailed later.

Since the image data read by the image reader IR can be stored in the image memory 150, by repeatedly transferring the image data to the printer controller 140 from the RAM, it is possible to make a plurality of copies by scanning the original document once. Furthermore, it is also possible to execute an electronic sort processing in which a processing of reading image data in a predetermined page order, for example, page 1 to page N→page 1 to page N→ . . . , to print the image, is repeated a plurality of times. It is also possible to execute a memory recall processing in which image data once printed is held, and then, the image data is read again to be printed in accordance with an input of a re-print request by a user. The process of the copying operation has been stored in a table in the RAM 125 of the general controller 120. When the image data read is printed actually, the CPU 122 controls the process of the copying operation by referring the table stored in the RAM 125. In other words, the CPU 122 functions as the controller for executing the electronic sort mode or the memory recall mode. The table will be detailed later.

Although the general controller 120 controls the whole copying operations by sending commands to the operation panel controller 110, the image reader controller 130 and the printer controller 140, since such a controlling method is similar to the controlling method employed in a conventional digital copying machine, the explanation will be omitted.

Figure 3:
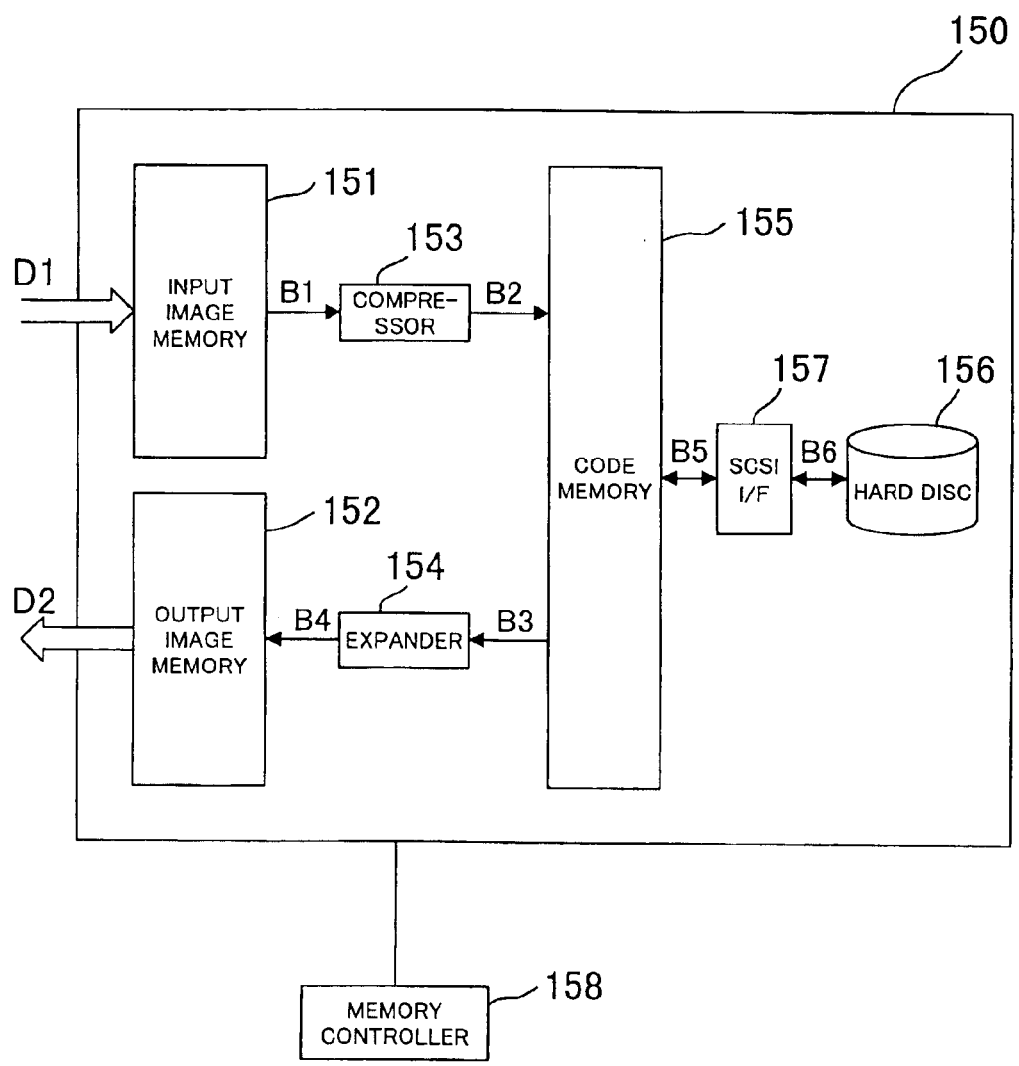
FIG. 3 is a block diagram of an image memory in the general controller of the control unit shown in FIG. 2.

FIG. 3 is a control block diagram showing the operation of the image memory 150 of the copying machine M. The image data read by the image reader IR is transferred to the input image memory 151 via the image bus D1. Since the image data is large in capacity, the image data is sent to the compressor 153 via the image bus B1 to be compressed. The compressed image data is transferred to the code memory 155 by the memory controller 158 as a writing means via the image bus B2. The code memory 155 is comprised of a DRAM in which a plurality of image data can be stored. The stored image data can be utilized in a state that the order is changed. When printing the image data, the image data selected in the code memory 155 is transmitted to the expander 154 via the image bus B3 to be expanded. Thereafter, the expanded image data is transferred to the output image memory 152 via the image bus B4. The image data in the output image memory 152 is output via the image bus D2 in synchronism with the page printer PRT.

The code memory 155 can store image data of a plurality of original documents. However, in cases where it is required to store a large amount of image data, the code memory 155 cannot store all of the image data. Thus, when it becomes impossible to store image data in the code memory 155, the image data is transferred to the hard disk 156 by the SCSI I/F 157 via the image buses B5 and B6. When printing the image data stored in the hard disk 156, the image data in the hard disk 156 is transferred to the code memory 155 once by the SCSI I/F 157 via the image buses B5 and B6. Thereafter, the image data is printed. The transfer of image data within the image memory 150 shown in FIG. 3 is performed by a memory controller 158. Since the SCSI I/F 157 belongs to a general technique, the explanation will be omitted.

Figure 4:
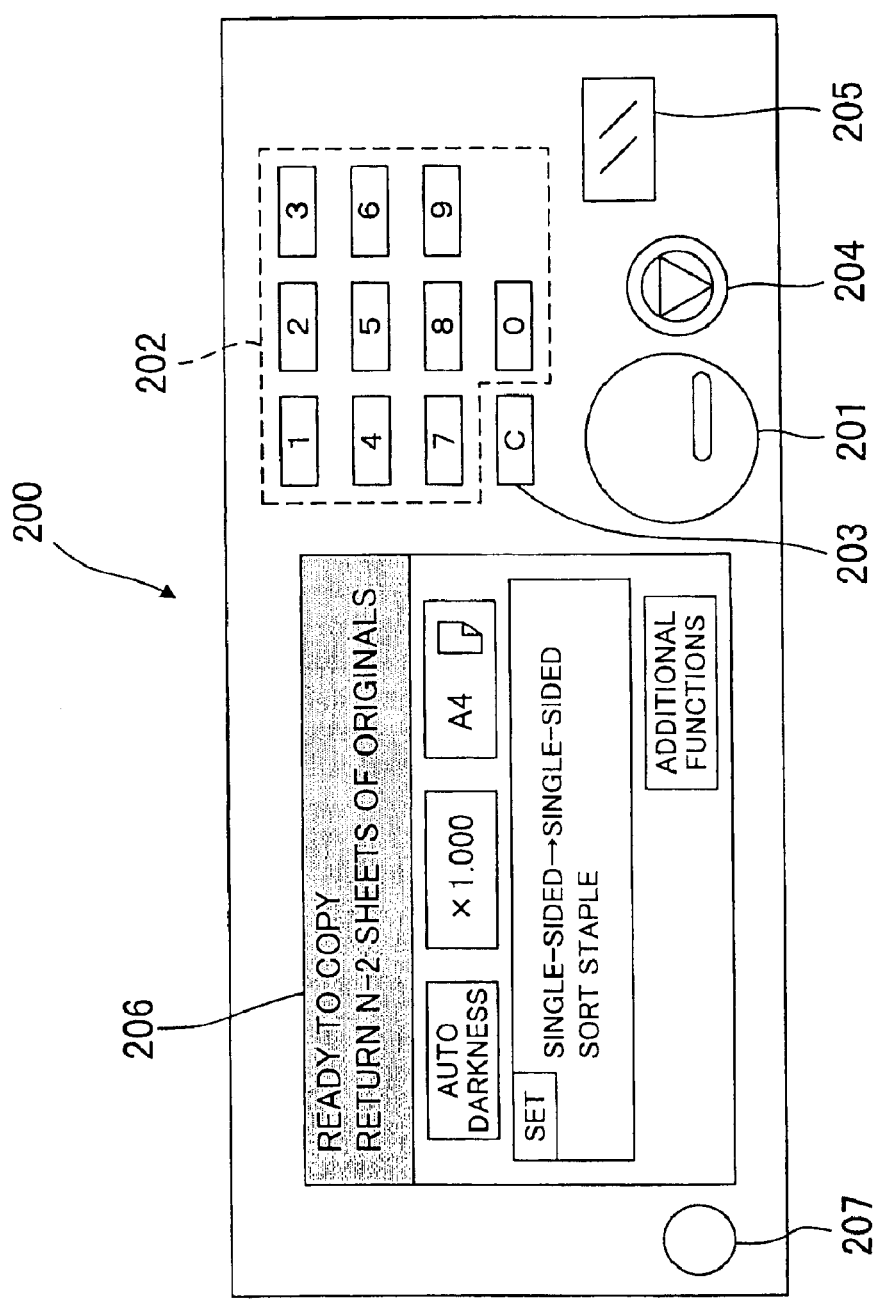
FIG. 4 is a plan view of an operation panel of the copying machine shown in FIG. 1.

FIG. 4 is a plan view showing the structure of the operation panel 200 of the copying machine M. The print start key 201 is used to start a copying operation, and the ten key 202 is used to input a numeral such as the number to be copied. The clear key 203 is used to clear the input numerals or discard the image data in the image memory 150. The stop key 204 is used to stop the copy operation or both the copy operation and the read operation. The panel reset key 205 is used to discard the set image mode and job.

Furthermore, the operation panel 200 is equipped with a liquid crystal display 206 having a touch panel thereon. By this touch panel, various settings corresponding to the displayed contents in the liquid crystal display 206 can be set up. For example, a magnification and other image mode can be set up.

The operation panel 200 is further provided with a recall memory key 207 for the memory recall processing. The electronic sort processing can be performed automatically by setting a plural copying numbers for a plurality of original documents.

Figure 5:
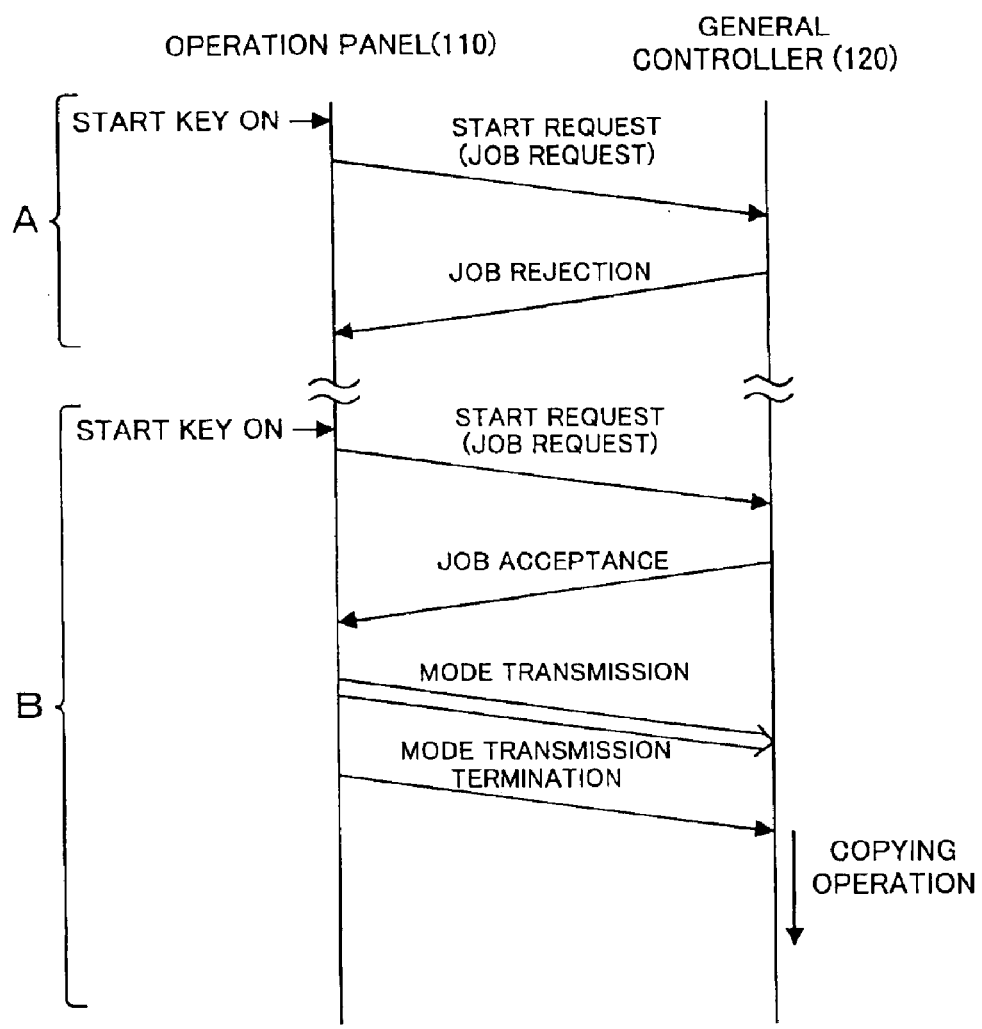
FIG. 5 shows a sequence in which the copying machine shown in FIG. 1 accepts a print operation of an image read by a image reader.

FIG. 5 shows a sequence in which the copying machine M accepts a print operation of an image read by the image reader IR.

When the start key 201 of the operation panel 200 is depressed, the operation panel controller 110 issues a start request (job request) to the general controller 120. The general controller 120 checks whether or not the below mentioned job acceptance conditions are satisfied, and returns the check result to the operation panel controller 110. In FIG. 5, "A" shows the case where the conditions are not satisfied, and "B" shows the case where the conditions are satisfied. As shown in A, if the conditions are not satisfied, the general controller 120 returns "job rejection" to the operation panel controller 110. If the conditions are satisfied, the general controller 120 returns "job acceptance" to the operation panel controller 110.

When the operation panel controller 110 receives "job acceptance," the controller transmits the operation mode information (information showing the operation conditions) for printing the image read by the image reader IR to the general controller 120, and transmits a transmission termination signal when the transmission of the operation mode information is terminated. When the general controller 120 receives the transmission termination signal, it starts the printing operation of the image read by the image read IR.

In the meantime, in the case where the transmitted mode is not the mode for immediately printing the image read by the image reader IR but the mode for printing the image after the image forming of the image data stored in the image memory 150 has been performed to some degree, after receiving the mode termination signal, the general controller 120 starts to store the image data read by the image reader IR into the image memory 150, and then prints the image at an appropriate timing (included in the aforementioned mode).

Figure 6:
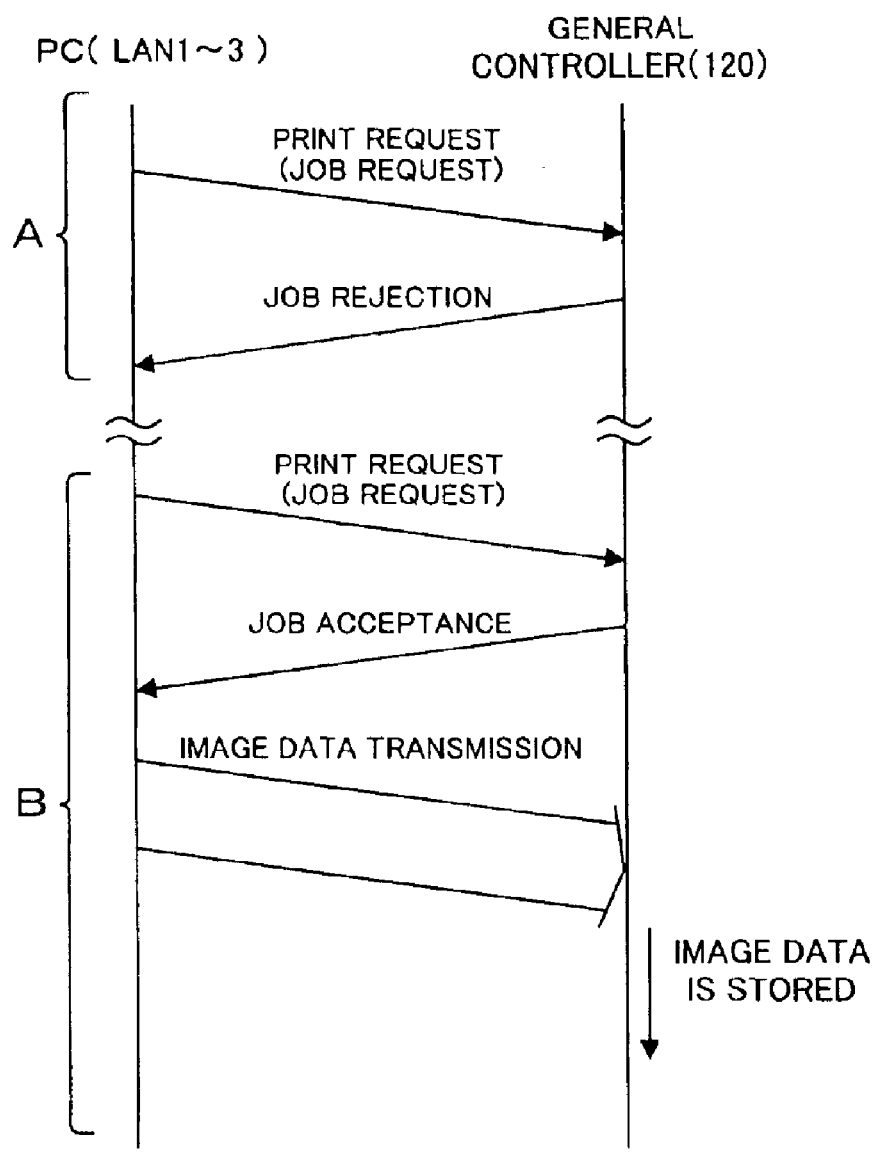
FIG. 6 shows a sequence in which the copying machine shown in FIG. 1 accepts a print operation from s personal computer (PC) on the LAN 1-LAN 3 shown in FIG. 2.

FIG. 6 shows a sequence in which the copying machine M accepts the print operation in accordance with the image data transmitted from personal computers (PC) on the LAN 1 to LAN 3. In this case, the PC (more concretely, the data transmitting interface of the PC) functions as a transmitting means for transmitting image data.

When the general controller 120 receives a "print request" (job request) from the PC, it judges whether or not it is possible to accept the job, and returns the result to the PC (in this case, a hand shaking is performed via the LANs). In FIG. 6, "A" shows the case where acceptance conditions are not satisfied. In this case, the general controller 120 returns "job rejection" to the PC. On the other hand, "B" shows the case where acceptance conditions are satisfied. In this case, the general controller 120 returns "job acceptance" to the PC.

As shown in B, when the PC receives "job acceptance," the PC transmits image data to the general controller 120. Then, the general controller 120 stores the image data into the code memory 155 of the image memory 150.

Figure 7:
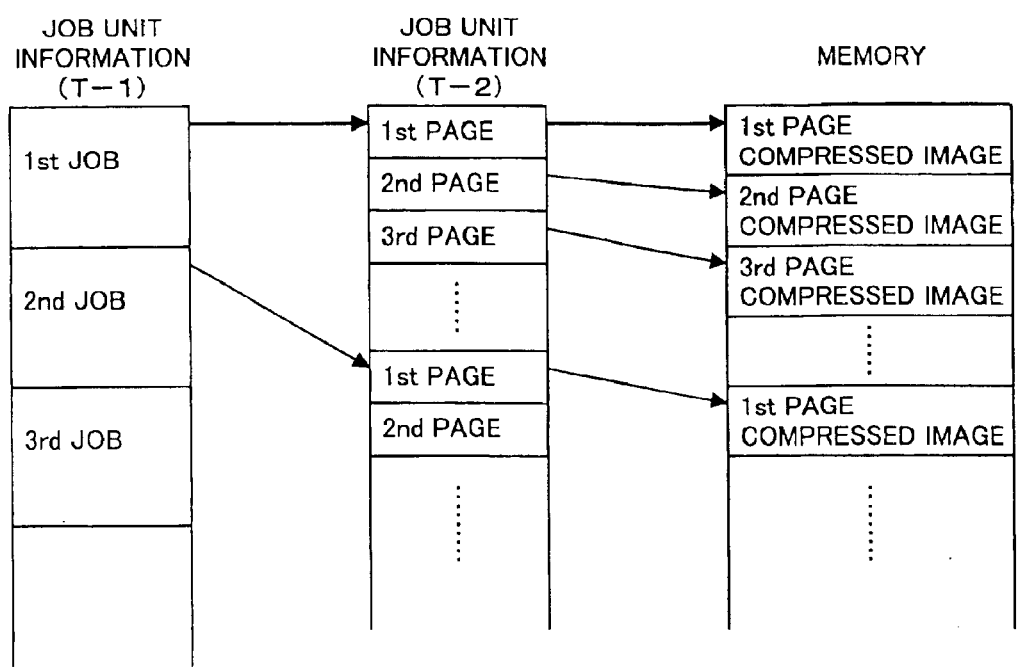
FIG. 7 is an explanatory view showing a schematic structure of a management table in a RAM which is referred to by the copying machine shown in FIG. 1 when the read image data is actually printed.

FIG. 7 is an explanatory view showing a schematic construction of the management table in the RAM 125 which is referred to by the copying machine M when the copying machine M actually prints the image data read or the image data transmitted from the PC.

Since it is necessary to manage the information on the image of the original image every job unit, a plurality of pages are stored in a divided manner in each job unit. Accordingly, the table includes a table (job unit information T-1) for storing the job unit information and a table (job unit information T-2) for storing the divided page unit information. The job includes a job which is read by the image reader IR of the digital copying machine 1 and a job which is input from an external apparatus such as a computer. The print data of the job transmitted from the outside is managed by the management table as one job in the same way as the image data read.

Stored in the job unit information T-1 are the job ID, the registration status of the job, the information concerning the page unit information address, the specified number of pages or sets and the type of economy copy. In the job unit information T-2, the information concerning the address of the compressed image data is stored.

The memory controller 158 reads out the image data from the input image memory 151, and compresses the image data. At this time, the memory controller 158 stores the compressed image data into the code memory 155 by controlling the compressor 153 while forming information of the management table. Furthermore, when outputting the image data, the memory controller 158 reads out the compressed image data from the code memory 155 contrary to the data storing. The information in the management table is deleted at the time of completion of the normal reading of the corresponding page information and the completion of the printing of the number of sheets or sets specified by the operator.

Figure 8:
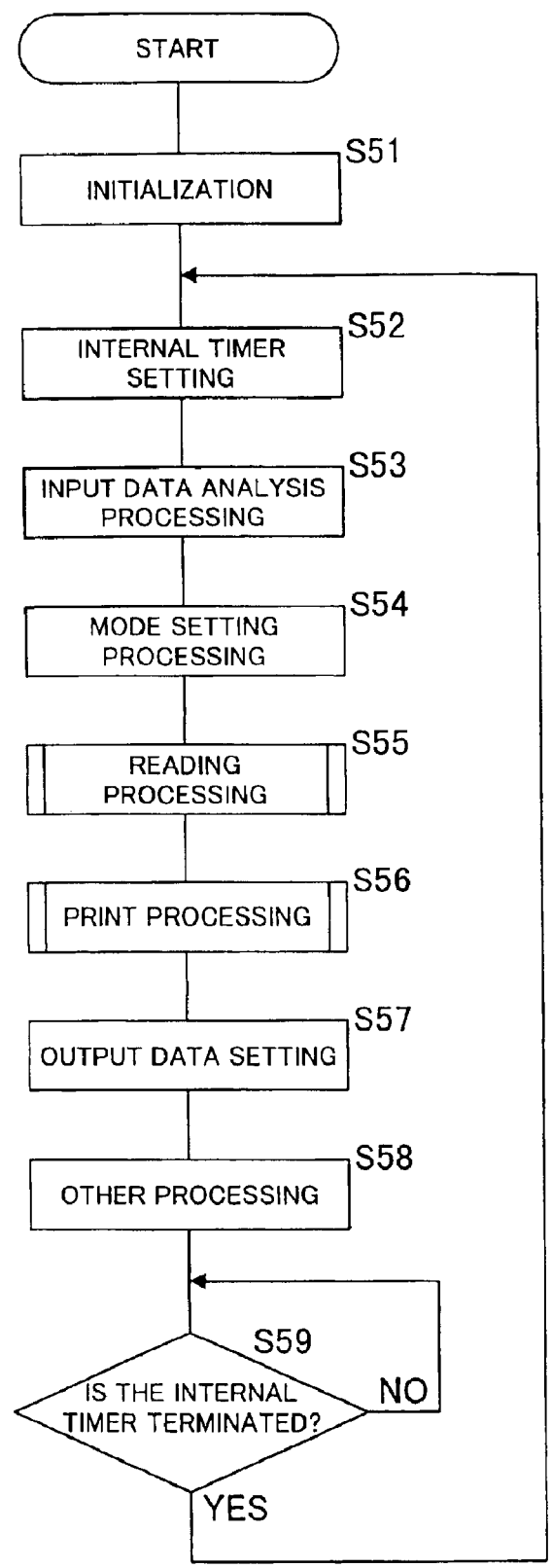
FIG. 8 is a flowchart showing a main routine of a CPU of the general controller which controls the copying machine shown in FIG. 1.

FIG. 8 is a flowchart showing a main routine of the CPU 122 of the general controller 120 which controls the copying machine M.

After the initialization (S51), the CPU 122 repeats the internal timer setting (S52), the input data analysis processing for checking the data input from another CPU (S53), the mode setting processing for setting the operation mode corresponding to the operation contents (S54), the reading processing (S55), the print processing (S56), the output data setting for holding the command at the communication port (S57), other processing (s58) and the waiting of the termination of the internal timer (S59). The peculiar processing of this embodiment resides in the reading processing (S55) which will be detailed later.

The print processing in S56 will be further explained. In this print processing, in addition to a normal print processing, a print processing in a memory recall mode and a print processing in an electronic sort mode are executed.

In cases where a recall memory mode is set by the operation panel 200, the image data of the code memory 155 is held as it is after the completion of the print processing of the first set of image data obtained by reading the original documents. Then, in accordance with a re-print request, the image data is read out from the code memory 155 in turn to be subjected to a print processing for the second set. When the memory recall mode is released, the aforementioned print processing for the second set will not be performed.

In cases where a plurality of print sets are set by the operation panel 200, a processing in an electronic sort mode is executed. The set of image data obtained by reading the original documents is stored in the code memory 155 in turn, and a print processing for the first set is performed by reading out the image data. After the completion of the print processing for the first set, the image data in the code memory 155 is maintained as it is. Subsequently, the image data is read out from the code memory 155 in turn to be subjected to a print processing for the second set. Thereafter, this processing will be repeated until the set number of prints can be obtained.

Next, the processing applied to the case where the capacity of the code memory 155 becomes full in the middle of a writing of the image data into the code memory 155 in the memory recall mode, will be explained with reference to FIG. 9.

In this embodiment, it is judged that the memory becomes full when image data exceeds the total capacity (for example, 16 M bits) of the code memory 155. The judgement is performed by the memory controller 158. In other words, the memory controller 158 functions as a memory full detector. Concretely, the detection is performed based on the data amount, assuming that the image data (the size is equal to the original document size) of the original document is compressed by the compressor 153 at the predetermined compression rate. In this embodiment, taking account of safety, the worst compression rate is employed as the predetermined compression rate. The worst compression rate for a photographic original document or an all half tone original document is 1.0. However, it is not limited to the worst compression rate, but may be an average compression rate or a compression rate slightly lower than an average compression rate. Furthermore, as will be mentioned later, the memory controller 158 functions as an overwrite detector which detects whether or not new image data is overwritten on the already stored image data.

As shown in FIG. 9(A), in the code memory 155, the size of the total memory area for one job is shown as |*total memory area for one job*|. When the memory area for storing the compressed image data is shown as |R1| assuming that the image data on page 1 of the original document is compressed at the compression rate 1.0, the memory controller 158 compares the |*total memory area for one job*| of the code memory 155 with the image data |R1| of page 1. If the |*total memory area for one job*| is larger than |R1| (|*total memory area for one job*1>|R|), the memory controller 158 reserves R1. Then, the image data of page 1 is compressed by the compressor 153 into the data P1. The data P1 is written in the code memory 155 as shown in FIG. 9(B).

Next, assuming that the image data on page 2 of the original document is compressed at the compression rate 1.0, it is judged whether or not it is possible to reserve R2 by comparing the memory are |R2| required to store the compressed image data with the remained area of the |*total memory area for one job*| of the code memory 155. If it is possible to reserve, as shown in FIG. 9(C), the image data R2 on page 2 is compressed into data P2. Then, the compressed data P2 is written into the code memory 155.

The memory reserved data P1 and P2 are read out in turn, and expanded by the expander 154 to be subjected to a print processing (image processing) by the printer PRT.

As shown in FIG. 9(C), assuming that the image data on page 3 of the original document is compressed at the compression rate 1.0, as a result of a judgement on whether or not it is possible to reserve R3 by comparing the memory area |R3| required to store the compressed image data with the remained area of the |*total memory area for one job*|, it is judged that it is impossible to reserve R3, i.e., the memory becomes full, because of the decreased remained area of the |*total memory area for one job*|.

In this case, the CPU 122 of the general controller 120 detects whether or not the already stored image data P1 and P2 has been printed. After the confirmation that the image data has been printed, the compressed data P3 of the image data R3 is forcibly written by allotting the storing area up to the storing area of the printed image data, as shown in FIG. 9(D). In cases where it is possible to store the actually compressed image data P3 in the remained area of the |*total memory area for one job*| without allotting the area of the actually compressed image data P3 to the storing area for the image data P1 and P2 because the size of the actually compressed image data P3 is smaller than that of the image data P3, the image data P3 is written in the remained area as shown in FIG. 9(E).

Thus, new image data is stored in the remained area of the code memory 155 as large amount as possible and held therein.

Next, it is assumed that the image data R4 cannot be written in the remained area and overwritten in any one of the areas for the already written image data P1 to P3 when the image data R4 is written in the code memory 155 as an actually compressed image data P4. Then, this is detected by the memory controller 158, and the CPU 122 of the general controller 120 forcibly releases the memory recall mode based on the abovementioned detected result. As shown in FIG. 9(F), the already stored image data P1 to P3 is discarded. Thereafter, the mode changes into a memory recall prohibition mode. Then, the printing up to the last page, or page n, is completed while repeating the writing of the image, the reading thereof and discarding thereof.

Figure 10:
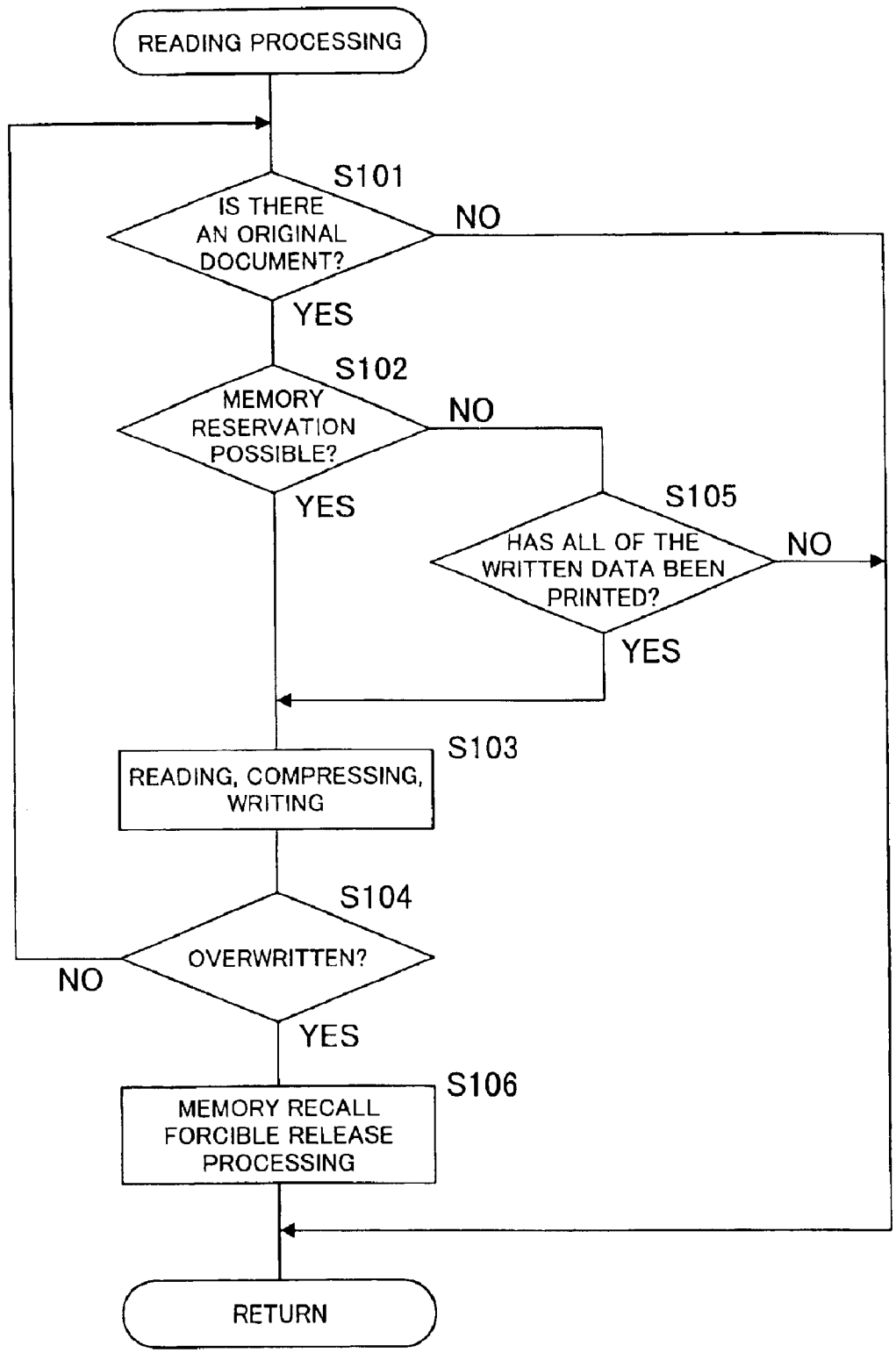
FIG. 10 is a flowchart showing a subroutine of the reading processing in the flowchart shown in FIG. 8 which shows the operation when the memory becomes full.

FIG. 10 is a flowchart showing the operation when the memory becomes full in the memory recall mode shown in FIG. 9, and is subroutine showing the contents of the reading processing in S55 in the main routine shown in FIG. 8. In the following explanation and drawings, a language "Step" will be abbreviated as "S".

In S101, it is checked whether or not there is the original document (page n). If there is the original document (YES in S101), in S102, assuming that the image data Rn of the page is compressed at the compression rate 1.0, it is judged whether or not it is possible to store (memorize) the image data in the |*total memory area for one job*|. If possible (YES in S102), the image data is read and actually compressed. Then, the compressed image data is written in the code memory 155. Thereafter, in S104, it is judged whether or not the written image data is overwritten on the already written image data. If not overwritten (NO in S104), the routine returns to S101 to check whether or not there is the subsequent original document.

As far as it is judged that it is possible to reserve new image data in the remained area of the code memory 155 in S102, the aforementioned operation is repeated. In the code memory 155, the image data written subsequently is stored and held in a compressed manner.

As a result of the judgement in S102, it is judged that it is impossible to reserve, or it is judged that the memory becomes full (NO in S102), in S105, it is judged whether or not the image data already stored in the code memory 155 has been printed for the reason of avoiding an overwrite of the new image data on the image data which has not been printed.

If the image data has not been printed (NO in S105), the routine returns to wait the completion of printing. If the image data has been printed (YES in S105), since there is no problem even if an overwriting occurs, in S103, the image data is read, compressed and written in the code memory 155 by allotting an area other than the remained area too. Thereafter, in S104, it is judged whether or not an overwriting occurred by writing the image data.

If no overwriting occurs because the size of the compressed image data is small (NO in S104), the routine returns to S101 and repeats the aforementioned processing until an overwriting occurs. If an overwriting occurs (YES in S104), in S106, the memory recall mode is forcibly released and the image data written in the code memory 155 is discarded, then the routine returns. Thereafter, in a state that the recall memory mode is prohibited, the printing process is executed in sequence while repeating the writing of the image data into the code memory 155, the reading thereof from the code memory 155 and the discarding thereof.

In the meantime, in S101, if there becomes no original document (NO in S101), the routine also returns.

Next, the processing applied to the case where the capacity of the memory becomes near full in the middle of a usage of the copying machine M shown in FIG. 1 in the memory recall mode, will be explained with reference to FIG. 11.

In this embodiment, it is judged that the memory becomes near full when the state of the code memory 155 becomes such that a certain amount of empty capacity such as 8 M bits among the full capacity (for example, 16 M bits) cannot be remained. The aforementioned 8 M bits corresponds to the data amount of A3 size document such as all half tone photographic original document compressed at the worst compression rate 1.0. Since it is practically enough to keep the empty capacity corresponding to the aforementioned data amount, the amount is set to the aforementioned empty capacity. If there is only a few number of all half tone original documents, the aforementioned certain amount of empty capacity may be smaller than 8 M bits, for example 7M bits. The memory controller 158 controls the accumulation status of the code memory 155 so that the data amount does not exceed the certain amount of empty capacity, and judges whether or not the memory becomes near full. Concretely, the detection of the memory near full is performed based on the data amount, assuming that the image data (the size is equal to the original document size) of the original document is compressed by the compressor 153 at the predetermined compression rate the same way as in the memory full detection shown in FIG. 9. In this embodiment, taking account of safety, the worst compression rate is employed as the predetermined compression rate. The worst compression rate for a photographic original document or an all half tone original document is set to 1.0. However, it is not limited to the worst compression rate but may be an average compression rate or a compression rate slightly lower than an average compression rate. As will be mentioned later, the memory controller 158 functions as a detection means which detects whether or not new image data is overwritten on the already written image data.

As shown in FIG. 11(A), in the code memory 155, the size of the total memory area for one job is shown as |*total memory area for one job*|. The reservation possible area within the total memory area is shown as |*reservation possible area*|. The aforementioned empty area of 8 M bits is shown as |*empty area*|.

When the memory area for storing the compressed image data is shown as |R1| assuming that the image data on page 1 of the original document is compressed at the compression rate 1.0, the memory controller 158 compares the |*reservation possible area*|of the code memory 155 with the image data |R1| of page 1. If the |*reservation possible area*| is larger than |R1| (|*reservation possible area*|>|R1|), as shown in FIG. 11(B), the image data of page 1 is compressed by the compressor 153 into the data P1. The data P1 is written in the code memory 155.

Next, assuming that the image data on page 2 of the original document is compressed at the compression rate 1.0, it is judged whether or not it is possible to reserve R2 by comparing the memory area |R2| required for storing the compressed image data with the remained area of the |*reservation possible area*| of the code memory 155. If it is possible to reserve, as shown in FIG. 11(C), the image data R2 on page 2 is compressed into data P2. Then, the compressed data P2 is written into the code memory 155.

The memory reserved image data P1 and P2 is read out in turn, expanded by the expander 154 and is subjected to a print processing (an image processing) by the printer PRT. Next, as shown in FIG. 11(C), assuming that the image data on page 3 of the original document is compressed at the compression rate 1.0, it is judged whether or not it is possible to reserve R3 by comparing the memory area |R3| for storing the compressed image data with the remained area of the |*reservation possible area*| of the code memory 155. In this case, it is assumed that it becomes impossible to reserve R3 in the |*reservation possible area*|, or a memory near full occurred, because of the decreased empty capacity in the |*reservation possible area*|.

In this case, it is judged by the CPU 122 of the general controller 120 whether or not the already stored image data P1 and P2 have been printed. After confirming that the image data have been printed, the compressed image data P3 of the image data R3 is forcibly written by allotting the storing area up to the storing area for the printed image data, as shown in FIG. 11(D). In this case, if the image data P3 can be stored in the remained area of the |*reservation possible area*| without allotting the storing area up to the storing area for the image data P1 and P2, as shown in FIG. 11(E), the image data P3 is written in the remained area.

As explained above, the new image data is stored and held in the remained area of the |*reservation possible area*| as large amount as possible.

Next, it is assumed that the image data R4 cannot be written in the remained area of the |*reservation possible area*| and is overwritten on any area of the already written image data P1 to P3 because the code memory 155 becomes near full when the image data R4 is being written in the code memory 155 as an actually compressed image data P4. This is detected by the memory controller 158, and the CPU 122 of the general controller 120 forcibly releases the memory recall mode based on the detected result. Then, as shown in FIG. 11(E), the already stored image data P1 to P3 is discarded. Thereafter, the mode changes into a memory recall prohibition mode. Then, in a state that the recall memory mode is prohibited, the printing process is executed up to the last page n in sequence while repeating the writing of the image data, the reading thereof and the discarding thereof.

Since the operation in the memory recall mode when the code memory becomes near full is the same as in the case shown by the flowchart in FIG. 10, the explanation will be omitted.

In the above embodiments, the memory recall mode is forcibly released when an overwriting of image data is detected. However, in cases where it is judged that it is necessary to overwrite, the written image data may be transferred to a hard disk 156 just before an occurrence of the overwriting, and these image data may be read from the hard disk 156 to be printed to continue the memory recall mode or the electronic sort mode.

In the processing shown in FIGS. 9 to 11, although processing in a memory recall mode are exemplified, the similar processing is also performed in an electronic sort mode.

Furthermore, in the aforementioned embodiments, although the present invention is applied to a copying machine, the present invention may also be applied to an image processing system including an image reading apparatus and a PC connected thereto, or an image transferring system such as a facsimile.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. An image processing system, comprising:

a memory for storing image data of a plurality of pages;

a compressor for compressing input image data;

writing means for writing a set of image data of a plurality of pages compressed by said compressor into said memory in sequence;

a first controller which executes a reading of the set of stored image data from said memory and an image processing thereof in sequence;

a second controller which executes a re-reading of the set of stored image data from said memory and an image processing thereof in sequence;

a first detector for detecting insufficiency of empty capacity of said memory based on a capacity, of image data of one page compressed at a predetermined compression rate; and a third controller which, in the event that insufficiency of empty capacity of said memory is detected by said first detector during the writing of image data into said memory by said writing means, continues the image processing by said first controller by writing new image data by said writing means after a termination of the image processing of the image data of at least one page stored previously by said first controller; and a second detector which detects an occurrence of an overwriting of the new image data on the stored image data at the time of writing the new image data by said third controller.

2. The image processing system as recited in claim 1, further comprising cancellation means for canceling the image processing by said second controller when said second detector detects the overwriting.

3. The image processing system as recited in claim 1, wherein the image data stored previously is transferred to another memory before the overwriting is detected by said second detector, and the image processing by said second controller is executed by using the image data stored in said another memory after the overwriting is detected.

4. The image processing system as recited in claim 1, wherein said first detector detects insufficiency of empty area of said memory under the condition that an empty area of a predetermined capacity remains in said memory.

5. The image processing system as recited in claim 1, wherein the image processing is a print processing for forming an image on a sheet based on image data.

6. The image processing system as recited in claim 1, further comprising an image reader for reading an original document to input image data.

7. The image processing system as recited in claim 1, further comprising setting means for setting a memory recall mode, wherein the image processing by said second controller is executed when the memory recall mode is set.

8. The image processing system as recited in claim 1, further comprising setting means for setting the number of prints, wherein the image processing by said second controller is executed when plural sets of prints are set.

9. An image processing method which compresses a set of input image data of a plurality of pages in sequence, writes the compressed image data into a memory in sequence and reads out the stored set of image data from the memory in sequence and executes an image processing thereof, the method including the steps of:

detecting insufficiency of empty capacity of the memory based on a capacity of compressed image data of one page at a prescribed compression rate during the writing of the image data into the memory;

continuing the image processing by writing a new image data after a termination of the image processing of the image data of at least one page previously stored when insufficiency of empty capacity of the memory is detected;

detecting an overwriting of the new image data on the image data already stored at the time of writing of the new image data; and executing the image processing by reading out the set of stored image data again from the memory in sequence when no overwriting is detected, and prohibiting an execution of the image processing by reading the image data again when the overwriting is detected.

10. The image processing method as recited in claim 9, wherein the step of detecting the insufficiency of empty capacity of the memory is performed by detecting the insufficiency of empty capacity of the memory under the condition that an empty area of a predetermined capacity remains in the memory.

11. The image processing method as recited in claim 9, wherein the image processing is a print processing for forming an image on a sheet based on image data.

12. The image processing method as recited in claim 9, further including the step of setting a memory recall mode, wherein an image processing by a re-reading of the image data is executed when the memory recall mode is set.

13. The image processing method as recited in claim 9, further including the step of setting the number of prints, wherein an image processing by a re-reading of the image data is executed when the number of prints is set.

\* \* \* \* \*